No. 659,953. Patented Oct. 16, 1900.
J. H. BARLOW.
DEVICE FOR EXTRACTING SHELLS FROM GUN BARRELS.
(Application filed Aug. 17, 1900.)
(No Model.)

UNITED STATES PATENT OFFICE.

JOHN H. BARLOW, OF NEW HAVEN, CONNECTICUT.

DEVICE FOR EXTRACTING SHELLS FROM GUN-BARRELS.

SPECIFICATION forming part of Letters Patent No. 659,953, dated October 16, 1900.

Application filed August 17, 1900. Serial No. 27,185. (No model.)

*To all whom it may concern:*

Be it known that I, JOHN H. BARLOW, of New Haven, in the county of New Haven and State of Connecticut, have invented a new Improvement in Devices for Extracting Cartridge-Shells from Gun-Barrels; and I do hereby declare the following, when taken in connection with the accompanying drawings and the letters of reference marked thereon, to be a full, clear, and exact description of the same, and which said drawings constitute part of this specification, and represent, in—

Figure 1:
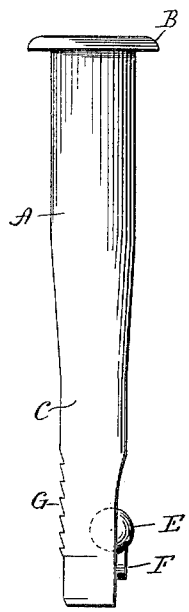
Figure 2:
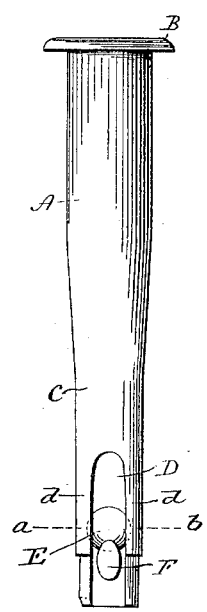
Figure 3:
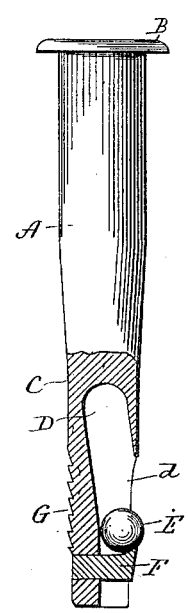
Figure 4:
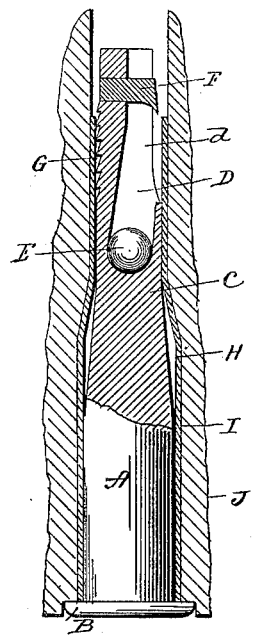
Figure 6:
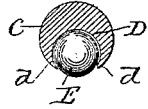
Figure 5:
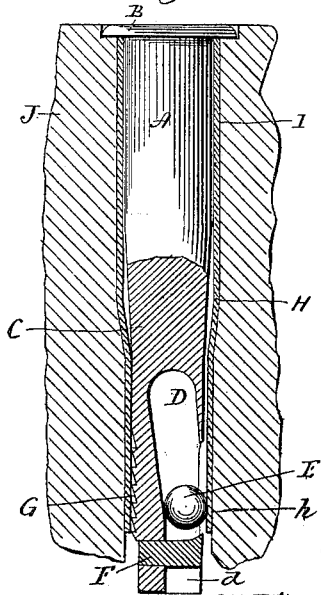
Figures 7, 8:
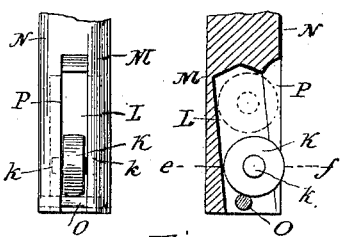
Figure 9:
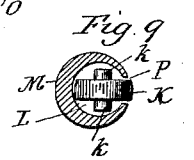

Figure 1, a view in side elevation of my improved device; Fig. 2, a view thereof looking directly into the groove in the nose of the body of the device; Fig. 3, a view of the device in longitudinal central section; Fig. 4, a corresponding view of the device as it appears when inserted into a cartridge-shell from which the head has been blown or torn off, leaving the headless shell in a gun-barrel, which is also shown in section; Fig. 5, a corresponding view showing the gun as reversed in position to cause the ball to run to the outer end of the groove where it grips the shell; Fig. 6, a view of the device in transverse section on the line $a\,b$ of Fig. 2; Fig. 7, a broken view of a modified form of the device looking at the edge of the movable shell-grip; Fig. 8, a broken sectional view showing the movable shell-grip in side elevation; Fig. 9, a sectional view on the line $e\,f$ of Fig. 8.

My invention relates to an improvement in that class of devices which are employed for extracting from gun-barrels cartridge-shells which have had their heads blown or torn off, the object being to provide for this purpose a simple, convenient, and effective implement composed of few parts and not liable to get out of order.

With these ends in view my invention consists in a device for extracting cartridge-shells from gun-barrels, having certain details of construction and combinations of parts, as will be hereinafter described, and pointed out in the claims.

In carrying out my invention, as shown in Figs. 1 to 7 of the drawings, I employ a bullet-shaped body A, formed at its rear end with a flange B and at its forward end with a long tapering nose C. In general outline the said body A has the form of a cartridge, than which, however, it is somewhat longer. The outer end of the nose C of the body is formed with a deep cross-sectionally-circular groove or chamber D, the longitudinal axis of which is slightly inclined to the longitudinal axis of the body and which is open at its forward end and at one side. This groove receives a freely-movable shell-grip in the shape of a ball E, which is confined within the groove both by a stop-pin F, passing transversely through the outer end of the nose C of the body, and by the virtually-overhanging side walls $d\,d$ of the groove. The bottom of the groove D is sufficiently inclined, so that when the said ball runs to its outer end a portion of the ball will project laterally beyond the external periphery of the nose of the body, as seen in Fig. 3. The exterior surface of the said nose is formed with serrations G, located opposite the lateral opening of the groove.

When the device is placed in such a position that the ball E will run to the bottom of the groove D, as seen in Fig. 4, the device may readily be inserted into a headless cartridge-shell H, from the inner end of which the nose of the body of the device will project, as seen in that figure, which shows the said shell H in the cartridge-chamber I of a gun-barrel J. Now if the gun be turned down the ball will run by the action of gravity toward the outer end of the groove until it is stopped by engagement with the inner wall of the cartridge-shell. With the ball in such engagement if the flange A of the device be taken hold of, as by the extractor or extractors of the gun, sufficient wedging action will be developed between the ball and the adjacent portion of the cartridge-shell at about the point $h$, Fig. 5, to exert an effort to force the ball toward the stop-pin F, and the greater the effort the more the ball will be forced in that direction, and therefore outward, and the more it is forced outward the greater it will bind upon the shell with which the body is thus coupled with sufficient power to enable the body to be used in extracting the shell. This crowding action of the ball E presses the serrations G of the nose C of the body against the opposite wall of the shell, which is thus doubly coupled with the device.

When it is desired to use my device for the extraction from a gun-barrel of a cartridge-shell which has had its head blown off or torn off, so that it cannot be taken hold of by the extractors of the gun, it is only necessary to push my device into the shell and tip the gun downward sufficiently to cause the ball to run by gravity outward in the groove, after which the extractors of the gun may be used in the ordinary manner for extracting the device and the shell with it.

In the modification shown by Figs. 7 to 9, inclusive, the movable grip of the device consists of a roller K, having a slightly-rounded periphery and formed with trunnions k k, which retain it in place within a cross-sectional circular chamber or groove L, formed in the nose M of the body N, entering the nose from the extreme outer end thereof and having its longitudinal axis inclined to the longitudinal axis of the body. The outer end of this groove or chamber is closed for the retention of the roller by means of a pin O and the edge of the roller being allowed to project in certain positions of the roller beyond the outer periphery of the nose through a longitudinal slot P, formed in the nose and intersecting the groove. The action of this modified form of device will be readily understood, as it parallels the action of the device already described.

I may mention that instead of placing the gun in position to cause the movable grip of the device to be acted upon by gravity the movable grip may be caused to take hold of the shell by inserting a ramrod or equivalent implement into the muzzle of the gun and striking the device a sharp blow upon the extreme end of the nose thereof.

It is apparent that in carrying out my invention some changes from the construction herein shown and described may be made, and I would therefore have it understood that I do not limit myself to the precise details of construction, but hold myself at liberty to make such changes and modifications as fairly fall within the spirit and scope of my invention.

Having fully described my invention, what I claim as new, and desire to secure by Letters Patent, is—

1. In a device for extracting headless cartridge-shells from gun-barrels, the combination with a body formed at one end with a laterally-opening groove or chamber, of a freely-movable shell-grip located in the said groove or chamber and projecting beyond the outer periphery of the body when in the outer portion of the said groove or chamber, whereby the shell is gripped for extraction.

2. In a device for extracting headless cartridge-shells from gun-barrels, the combination with a body formed at one end with a laterally-opening groove or chamber arranged at an acute angle with respect to the longitudinal axis of the body, of a freely-movable shell-grip confined within the said groove or chamber, and projecting laterally therefrom when near the outer end thereof.

3. In a device for extracting headless cartridge-shells from gun-barrels, the combination with a body formed at one end with a laterally-opening groove or chamber, of a freely-movable shell-grip located in the said groove or chamber from which it projects laterally when near the outer end thereof, and means located in the outer end of the said groove or chamber for confining the movable shell-grip therein.

4. In a device for extracting headless cartridge-shells from gun-barrels, the combination with a body formed at one end with a laterally-opening groove or chamber, of a freely-movable shell-grip located in the said groove or chamber from which it laterally projects when near the outer end thereof, and gripping means located upon the exterior surface of the body at a point opposite the bottom of the said groove or chamber.

5. In a device for extracting headless cartridge-shells from gun-barrels, the combination with a body formed at one end with a flange and at its opposite end with a laterally-opening groove or chamber, of a freely-movable shell-grip located within the said groove or chamber in which it is movable back and forth, and from which it laterally projects when near the outer end thereof.

6. In a device for extracting headless cartridge-shells from gun-barrels, the combination with a body formed at one end with a laterally-opening groove or chamber, of a ball constituting a movable shell-grip confined within the said groove from which it laterally projects when near the outer end thereof so as to grip the shell.

In testimony whereof I have signed this specification in the presence of two subscribing witnesses.

JOHN H. BARLOW.

Witnesses:
J. H. SHUMWAY,
FREDERIC C. EARLE.